April 2, 1946. F. M. LEWIS 2,397,673
DUAL WHEEL DRIVE MECHANISM
Filed March 4, 1943
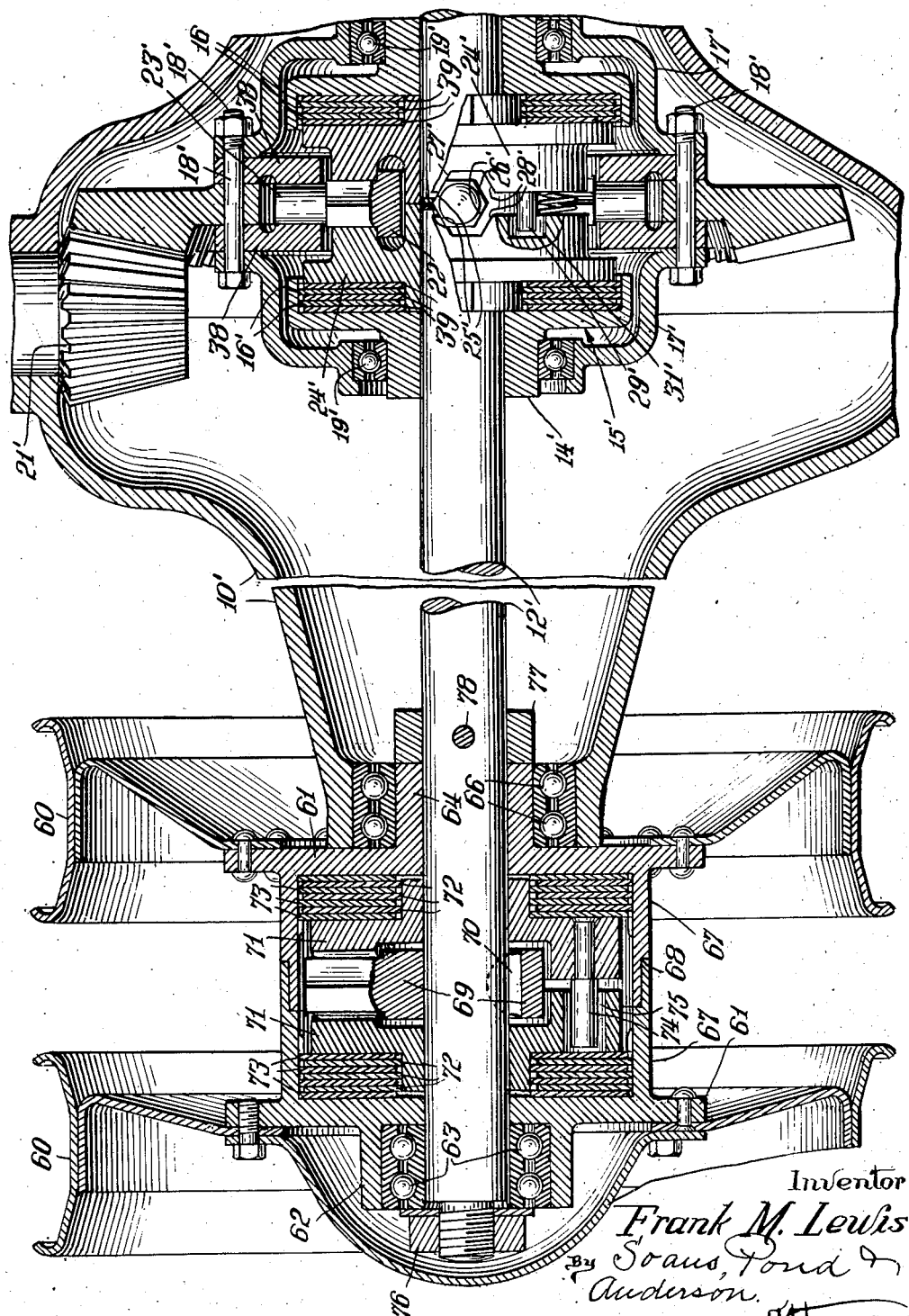
Inventor
Frank M. Lewis
By Soans, Pond & Anderson.
Attorneys Patented Apr. 2, 1946

2,397,673

UNITED STATES PATENT OFFICE 2,397,673

DUAL WHEEL DRIVE MECHANISM

Frank M. Lewis, White Cloud, Mich.

Application March 4, 1943, Serial No. 477,951

2 Claims. (Cl. 180—22)

This invention relates to dual wheel drive mechanism for the rear axle of automobiles, motor vehicles, and the like. The present invention is associated with a form of differential gearing typically illustrated by Letters Patent No. 1,286,362 granted to me on the 3d day of December, 1918, characterized by the provision of a central driving spider, laterally shiftable driving clutch members on either side of said spider forced outwardly by cams on the latter, and cooperating driven clutch members fast on the inner ends of the axle sections cooperating with said slidable driving clutch members, with means for limiting relative rotation of the driving clutch members so as to provide for an inward shifting movement of the latter when one pair of wheels driven thereby overruns, as in turning a corner.

In my prior patent aforesaid and in subsequent patents issued to me on this type of differential gear, the driving and driven clutch members are formed with cooperating teeth. While this form of clutch is efficient, it is somewhat noisy in operation and the teeth are subjected to considerable wear when the clutch is thrown in and out. The form of differential associated with my present invention provides the driving and driven clutch members with suitable cooperating friction clutch surfaces, and also with means for insuring cooperative engagement of said surfaces under the turning movement of the driving spider and its cams, which will eliminate the noisy character of the gear above referred to, cheapen the cost, reduce wear, and make it possible to manually disconnect the clutch members when under load.

In numerous types of heavy motor vehicles, such as busses, truck and tractors, the rear axle is equipped with two traction wheels located side by side on each end. When traveling in a curved path, and notably a sharply curved path as in rounding a corner, the outer wheel of the pair has a longer path of travel than the inner wheel, and if both wheels are driven by the axle or the inner wheel is driven by the axle and the outer wheel is locked to the inner wheel, the outer wheel necessarily drags more or less on the roadway, and thus causes abrasion and wear on its tire. The object of the present invention has been to cure this fault, and this is done by inserting a differential drive from the axle to the two wheels by which both wheels are driven on a straight track, but the outer wheel may overrun the inner wheel on a curved track.

In the accompanying drawing I have illustrated a practical embodiment of my invention.

The figure shows at the right a main axle driving differential, and at the left two traction wheels on the outer end portion of one axle section, with an axle driven differential drive between the two wheels.

In the drawing, 10' designates each of the bell-shaped housing sections of a main central differential. 12' designates each of the two alined axle sections preferably disposed with their inner ends in contact. In this case the hubs 14' of the driven clutch members 15' are suitably splined on the shaft sections 12' so as to rotate therewith. The friction clutch herein illustrated is of the multiple disc type, and 16' designates the discs keyed to and carried by the clutch member 15'. 17' designates the rotatable drum or housing, in this case journaled on the hubs 14' by anti-friction bearings 19'. This drum is made in mating sections united by through bolts 18', said bolts also serving for the interconnection of a pair of rings 38, between which is clamped the web of a master gear driven by a pinion 21'. 22 designates the spider formed with radial studs or spokes 23', the outer ends of which are securely clamped between the inner portions of the rings 38. On opposite sides of this spider are slidably mounted, on the inner meeting ends of the axle sections 12', the driving friction clutch members 24', each carrying on its hub a group of friction discs 39 internested with the friction discs 16'.

On the spokes 23' of the spider are formed forward driving cams 25' that cooperate with corresponding cams 27' in the inner faces of the clutch members 24' for forward driving, and similar cams 26' that cooperate with cams 28' on the inner faces of the clutch members 24' for rearward driving. A movement limiting pin 29' on the inner face of each clutch member entering a hole 31' in the face of the opposite clutch member serves to limit the rotative movement of each clutch member relatively to the spider.

The figure illustrates a construction wherein each end of the rear axle is equipped with a pair of traction wheels disposed side by side. In such a construction, when rounding a curve, one of the two wheels of the pair must overrun the other to avoid dragging of the faster wheel on the ground with consequent wear on the tire. To take care of this situation, I provide between the two end wheels a differential drive from the axle section on which the wheels are mounted, and this drive may be substantially a duplicate of the central differential. The figure shows the companion traction wheels 60, each of which has bolted thereto a central web or hub portion 61. The web or hub portion 61 of the outer wheel is formed with an outwardly directed flange 62 containing an anti-friction bearing 63 in which the outer end of the axle section 12' is supported. The web or hub portion of the inner wheel has an outwardly directed flange 64 journaled on the axle section 12', between which flange and the outer end of the axle bridge or housing 10' is an anti-friction bearing 66. On the inner opposed faces of the web or hub portions 61 are drum sections or flanges 67 that are opposed to and overlap each other in a slip joint 68.

69 designates a driving spider, keyed to and driven by the axle section 12' as shown at 70. 71 designates each of the two driving clutch members, each equipped with a plurality of discs 72 fast on its hub that cooperate with a corresponding plurality of discs 73 fast with the drum section or flange 67 of the wheel. The two driving clutches 71 are equipped, the one with a pin 74 and the other with a hole or slot 75 for limiting the relative rotary movements of the two driving clutch members 71.

The radial arms of the central driving spider 69 are formed with forward and rear driving cams, similar to the cams 25' and 26' of the central differential herein shown, cooperating with corresponding cams on the inner faces of the driving clutches 71.

A nut 76 on the threaded outer end of the axle section 12', bearing against the outer anti-friction bearing 63, and a collar 77 secured to the shaft section by a pin 78 and bearing against the outer end of the hub 64 confine the two wheels against movement lengthwise of the shaft section 12'.

On rounding a curve, the wheel 60 having the longer path of travel overruns its companion wheel, thereby releasing its clutch drive, until the two wheels are again running on straight track, when the drive of both wheels is automatically restored, all as previously described in connection with the drive of the two axle sections 12' by the central differential.

While I have herein illustrated and described the preferred embodiment of the invention, variations and modifications in the details of structure and arrangement may be resorted to within the scope and coverage of the appended claims.

I claim:

1. In a mechanism of the class described, the combination of a power-driven axle mounted in a main supporting housing, a pair of wheels having hub portions supported directly on said axle with opposed annular flanges spaced radially from said axle and interfitting along their opposed perimeters to provide an auxiliary housing, a driving spider located within said auxiliary housing between said pair of wheel hubs and connected directly to said axle in the plane of said spider so as to rotate with said axle, a pair of annular axially-shiftable driven clutch members mounted directly on said axle on opposite sides of said driving spider, friction means interposed between each of such driven clutch members and said wheel hubs, coacting cam surfaces on the opposed faces of said driving spider and said driven clutch members adapted to effect the axial shifting of said clutch members on said axle to cause the engagement of said friction means whereby to secure the simultaneous forward and rearward driving of both of said wheels on a straight track with the freedom of either wheel to overrun its companion wheel on a curve.

2. In a mechanism of the class described, the combination of a power-driven axle mounted in a main supporting housing, a pair of wheels having hub portions supported directly on said axle with opposed annular flanges spaced radially from said axle and interfitting along their opposed perimeters to provide an auxiliary housing, an anti-friction bearing interposed between an axial flange on the outer wheel hub and said axle, a second anti-friction bearing interposed between an axial flange on the inner wheel hub mounted directly on said axle and said main supporting housing, a driving spider located within said auxiliary housing between said pair of wheel hubs and connected directly to said axle in the plane of said spider so as to rotate with said axle, a pair of annular axially-shiftable driven clutch members mounted directly on said axle on opposite sides of said driving spider, friction means interposed between each of such driven clutch members and said wheel hubs, coacting cam surfaces on the opposed faces of said driving spider and said driven clutch members adapted to effect the axial shifting of said clutch members on said axle to cause the engagement of said friction means whereby to secure the simultaneous forward and rearward driving of both of said wheels on a straight track with the freedom of either wheel to overrun its companion wheel on a curve.

FRANK M. LEWIS.